United States Patent
Annen et al.

(10) Patent No.: US 10,060,580 B2
(45) Date of Patent: Aug. 28, 2018

(54) LIGHT EMITTING DEVICE

(71) Applicant: Sharp Kabushiki Kaisha, Osaka-shi, Osaka (JP)

(72) Inventors: Kazunori Annen, Osaka (JP); Toshiki Matsuoka, Osaka (JP); Yuuichi Kanbayashi, Osaka (JP); Masamichi Harada, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 264 days.

(21) Appl. No.: 14/821,935

(22) Filed: Aug. 10, 2015

(65) Prior Publication Data

US 2016/0084451 A1   Mar. 24, 2016

(30) Foreign Application Priority Data

Sep. 24, 2014   (JP) .................................. 2014-194272

(51) Int. Cl.

| | |
|---|---|
| *F21K 9/64* | (2016.01) |
| *F21K 99/00* | (2016.01) |
| *F21V 8/00* | (2006.01) |
| *F21K 9/61* | (2016.01) |
| *F21S 41/14* | (2018.01) |
| *F21S 41/24* | (2018.01) |
| *F21S 41/255* | (2018.01) |
| *F21S 41/32* | (2018.01) |
| *F21S 41/16* | (2018.01) |
| *F21Y 101/00* | (2016.01) |
| *F21Y 115/30* | (2016.01) |
| *F21S 45/47* | (2018.01) |
| *F21V 9/30* | (2018.01) |

(52) U.S. Cl.
CPC .................. *F21K 9/52* (2013.01); *F21K 9/61* (2016.08); *F21K 9/64* (2016.08); *F21S 41/14* (2018.01); *F21S 41/16* (2018.01); *F21S 41/24* (2018.01); *F21S 41/255* (2018.01); *F21S 41/321* (2018.01); *G02B 6/0006* (2013.01); *F21S 45/47* (2018.01); *F21V 9/30* (2018.02); *F21Y 2101/00* (2013.01); *F21Y 2115/30* (2016.08)

(58) Field of Classification Search
CPC ........................................................ F21K 9/64
USPC ........................................ 362/293, 555, 581
See application file for complete search history.

(56) References Cited

U.S. PATENT DOCUMENTS

| | | | |
|---|---|---|---|
| 2004/0129945 A1 | 7/2004 | Uemura | |
| 2005/0105301 A1 | 5/2005 | Takeda et al. | |
| 2006/0203468 A1* | 9/2006 | Beeson | G02B 27/286 |
| | | | 362/84 |

(Continued)

FOREIGN PATENT DOCUMENTS

| | | |
|---|---|---|
| JP | 2004-111909 A | 4/2004 |
| JP | 2005-150041 A | 6/2005 |

(Continued)

*Primary Examiner* — Julie Bannan
(74) *Attorney, Agent, or Firm* — Keating & Bennett, LLP

(57) ABSTRACT

A light emitting device of the present disclosure includes a light emitting section that generates fluorescence by receiving laser light, a reflection film that reflects laser light which is radiated to the vicinity of the light emitting section, among laser light which is emitted toward the light emitting section from a rod lens, and a reflection mirror that collects the laser light reflected by the reflection film, in the light emitting section.

4 Claims, 9 Drawing Sheets

(56) References Cited

U.S. PATENT DOCUMENTS

| | | | |
|---|---|---|---|
| 2007/0081336 A1* | 4/2007 | Bierhuizen | H04N 9/315 |
| | | | 362/293 |
| 2008/0310158 A1* | 12/2008 | Harbers | F21K 9/54 |
| | | | 362/240 |
| 2009/0040598 A1 | 2/2009 | Ito | |
| 2011/0141763 A1 | 6/2011 | Kamee et al. | |

FOREIGN PATENT DOCUMENTS

| | | |
|---|---|---|
| JP | 2009-016543 A | 1/2009 |
| JP | 2009-043668 A | 2/2009 |
| JP | 2011-123368 A | 6/2011 |
| JP | 2012-099222 A | 5/2012 |
| JP | 2013-131335 A | 7/2013 |
| WO | 2014/203488 A1 | 12/2014 |

\* cited by examiner

LIGHT EMITTING DEVICE

BACKGROUND

1. Field

The present disclosure relates to a light emitting device that uses excitation light, and specifically, to a light emitting device that uses, as illumination light, light including fluorescence which is generated by radiating excitation light to a light emitting section including a phosphor and an illumination device that includes the light emitting device.

2. Description of the Related Art

A light emitting device which includes a semiconductor laser or the like as an excitation light source and performs illumination or the like using excitation light emitted from the excitation light source has been proposed lately. A light emitting device that uses such excitation light is proposed in, for example, Japanese Unexamined Patent Application Publication No. 2005-150041 (published on Jun. 9, 2005), Japanese Unexamined Patent Application Publication No. 2004-111909 (published on Apr. 8, 2004), Japanese Unexamined Patent Application Publication No. 2012-099222 (published on May 24, 2012), and Japanese Unexamined Patent Application Publication No. 2009-016543 (published on Jan. 22, 2009).

In Japanese Unexamined Patent Application Publication No. 2005-150041, a light emitting device 101 is proposed, which includes a laser diode 102, a phosphor 103, a first reflection mirror 104, a second reflection mirror 106, and a light-transmitting member 107, and in which fluorescence that is generated by the phosphor 103 is reflected by the second reflection mirror 106, and is emitted to the outside (refer to FIG. 10).

In addition, in Japanese Unexamined Patent Application Publication No. 2004-111909, a light emitting device 201 is proposed, which includes an LED 202, a first reflector 203, a second reflector 204, and a phosphor layer 205, and in which excitation light is collected in a slit 204a by the first reflector 203, and excitation light that is transmitted through the slit 204a is radiated to the phosphor layer 205 (refer to FIG. 11).

In addition, in Japanese Unexamined Patent Application Publication No. 2012-099222, a light emitting device 301 is proposed, which includes a solid state light source 302, a phosphor layer 303, and a diffusion unit 304, and in which the diffusion unit 304 that diffuses excitation light is disposed in the periphery of the phosphor layer 303 (refer to FIG. 12).

In addition, in Japanese Unexamined Patent Application Publication No. 2009-016543, a light emitting device 401 is proposed, which includes a semiconductor light emitting element 402, a wavelength converting member 403, and a cap 404, and in which the wavelength converting member 403 is disposed in a light extraction window of the cap 404 (refer to FIG. 13).

However, the related art as described above has problems in that excitation light or the like is generated but some excitation light is not radiated to a light emitting section, and thereby utilization efficiency of the excitation light is decreased.

That is, in Japanese Unexamined Patent Application Publication No. 2005-150041, the excitation light that is reflected by a surface of the phosphor 103 or the first reflection mirror 104, among the excitation light that is emitted toward the phosphor 103, is reflected by the second reflection mirror 106 and is emitted to the outside in a state of coherent light. Accordingly, excitation light that is used for excitation of the phosphor 103 is reduced.

In addition, in Japanese Unexamined Patent Application Publication No. 2004-111909, not all the excitation light that is transmitted through the slit 204a is radiated to the phosphor layer 205, and part of the excitation light is emitted to the outside of the light emitting device 201. Similarly, in Japanese Unexamined Patent Application Publication No. 2012-099222, the excitation light that is not radiated to the phosphor layer 303 is diffused by the diffusion unit 304 and is emitted to the outside of the light emitting device 301. Accordingly, the excitation light that is used for excitation of the phosphor layers 205 and 303 is reduced.

Furthermore, in Japanese Unexamined Patent Application Publication No. 2009-016543, the excitation light that is not radiated to the wavelength converting member 403 is trapped inside the cap 404, but any unit that may guide the excitation light to the wavelength converting member 403 is not described. Accordingly, it is not possible to efficiently use the excitation light that is not radiated to the wavelength converting member 403 for excitation of the wavelength converting member 403.

SUMMARY

It is desirable to provide a light emitting device that reduces excitation light which is not radiated to a light emitting section and is not used for generating fluorescence and that has a high utilization efficiency of the excitation light, and an illumination device that includes the light emitting device.

A light emitting device according to an aspect of the disclosure includes: an excitation light emitting section that emits excitation light; a light emitting section that receives the excitation light emitted from the excitation light emitting section and generates fluorescence; an optical member that reflects excitation light which is radiated to the vicinity of the light emitting section, among excitation light emitted from the excitation light emitting section, toward the excitation light emitting section, or emits wavelength-converted light, in which a wavelength of the excitation light is converted, toward the excitation light emitting section; and a reflection mirror that collects the excitation light reflected by the optical member or the wavelength-converted light emitted from the optical member, in the light emitting section.

BRIEF DESCRIPTION OF THE DRAWINGS

FIG. 3A illustrates the workings of the light emitting device according to the first embodiment, and FIG. 3B illustrates, as a comparative example, the workings of a light emitting device in which a reflection film is replaced with an absorption film;

DESCRIPTION OF THE EMBODIMENTS

First Embodiment

An embodiment according to the present disclosure will be described with reference to FIG. 1 to FIG. 3B as follows. In the present embodiment, an example of an illumination device (a spotlight, a headlamp for a vehicle, or the like) including a light emitting device according to the present disclosure will be described.

Configuration of Illumination Device 1

Figure 1:
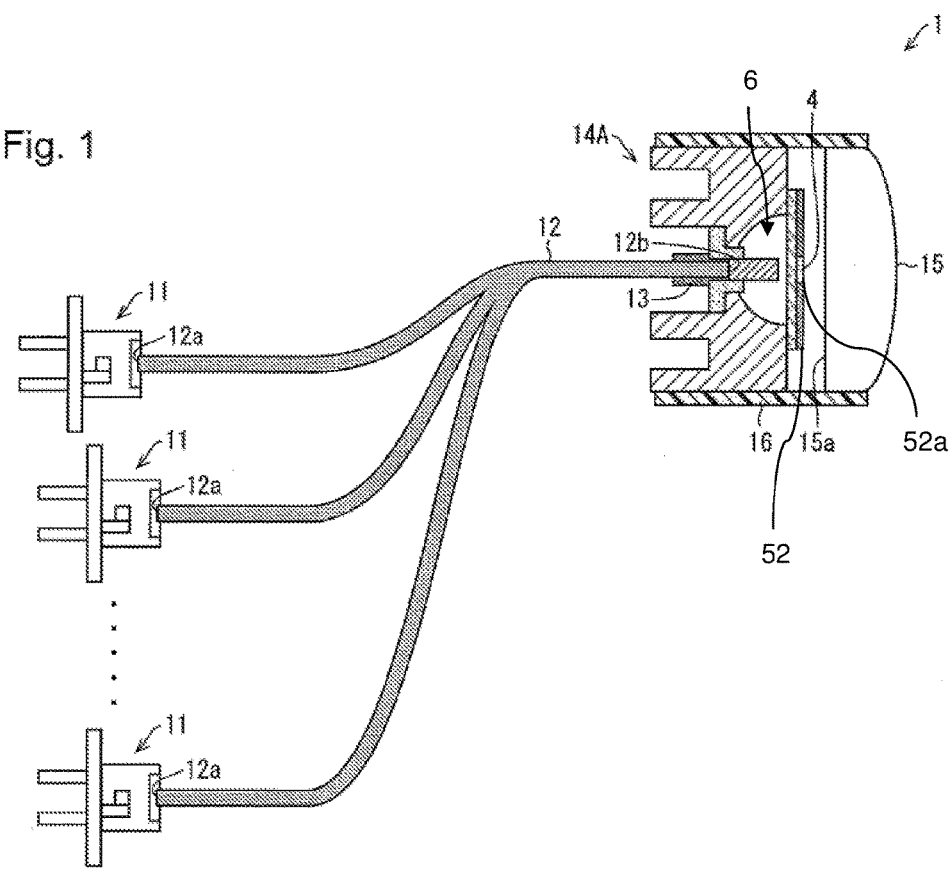
FIG. 1 is a sectional view illustrating a configuration of an illumination device according to a first embodiment.

FIG. 1 is a sectional view illustrating a configuration of an illumination device 1 according to a first embodiment. The illumination device 1 uses, as illumination light, light that is obtained by mixing laser light that is emitted from a semiconductor laser 11 with fluorescence that is obtained by converting the wavelength of a part of the laser light.

As illustrated in FIG. 1, the illumination device 1 includes the semiconductor laser 11, an optical fiber 12, a ferrule 13, a light emitting device 14A, a light-transmitting lens 15, and a light-transmitting lens fixing section 16.

Semiconductor Laser 11

The semiconductor laser 11 is an excitation light source that emits laser light (excitation light). In the present embodiment, the illumination device 1 includes a plurality of the semiconductor lasers 11. The laser light that is emitted from the semiconductor laser 11 has a spatial phase and a temporal phase, and the wavelength of the laser light is a single wavelength. Accordingly, by using the laser light as the excitation light, a phosphor that is included in a light emitting section 4 can be efficiently excited, and thus it is possible to obtain high intensity illumination light.

The present embodiment has a configuration in which all of the plurality of the semiconductor lasers 11 are used as excitation light sources that emit excitation light (for example, blue excitation light with a single wavelength), but the present disclosure is not limited to this configuration. A visible light laser with a wavelength different from that of the excitation light may be emitted from part of the plurality of the semiconductor lasers 11. For example, red laser light different from the excitation light may be emitted from the part of the semiconductor lasers 11, and thereby it is possible to increase the color rendering properties of the illumination device 1.

The laser light that is output from each of the plurality of the semiconductor lasers 11 is radiated to the light emitting section 4 that is included in the light emitting device 14A through the optical fiber 12. Part of the laser light that is radiated to the light emitting section 4 is converted into fluorescence by a phosphor included in the light emitting section 4.

The wavelength and light output of the laser light that is emitted from the semiconductor lasers 11 is appropriately set depending on the type of the phosphor included in the light emitting section 4. It is possible to select the laser light with a wavelength, for example, equal to or longer than 440 nm and equal to or shorter than 480 nm as excitation light. In the present embodiment, each semiconductor laser 11 emits blue laser light with a wavelength of 440 nm.

The laser light that is emitted from the semiconductor laser 11 is incident on an incident end portion 12a that is one end portion of the optical fiber 12. At this time, in order to make the laser light appropriately incident on the incident end portion 12a of the optical fiber 12, it is preferable to use an aspheric lens. The material of the aspheric lens is not limited particularly, but it is preferable to use a material with high light-transmittance and high heat-resistance properties for the laser light that is emitted from the semiconductor laser 11.

The number of semiconductor lasers 11 to be used can be appropriately selected depending on an necessary output. Thus, it is not necessary to use a plurality of semiconductor lasers 11 in some cases, and only one of the semiconductor lasers 11 may be used. However, in order to obtain a high-power laser light, it is preferable to use a plurality of semiconductor lasers 11.

In addition, instead of the semiconductor laser 11, an LED or the like may be used as an excitation light source. However, from the viewpoint of obtaining high intensity illumination light, it is preferable to use the semiconductor laser 11 as an excitation light source.

Optical Fiber 12

The optical fiber 12 is a light guiding member that guides the laser light which is emitted from the semiconductor laser 11 to the light emitting device 14A. In the present embodiment, the optical fiber 12 is configured by a bundle of fibers in which a plurality of optical fibers are bundled up.

The optical fiber 12 includes the incident end portion 12a on which the laser light is incident, and an emission end portion 12b from which the laser light that is incident from the incident end portion 12a is emitted. The incident end portion 12a is coupled to the semiconductor laser 11, and the emission end portion 12b is coupled to the light emitting device 14A.

Ferrule 13

The ferrule 13 is attached to the emission end portion 12b of the optical fiber 12 and holds the emission end portion 12b. The ferrule 13 has a plurality of holes into which, for example, the emission end portion 12b can be inserted.

If only one optical fiber 12 is used, the ferrule 13 can be omitted. However, it is preferable to provide the ferrule 13 in order to correctly fix the position of the emission end portion 12b.

Light Emitting Device 14A

The light emitting device 14A emits illumination light that includes fluorescence by using the laser light which is emitted from the semiconductor laser 11. Specifically, the light emitting device 14A generates fluorescence by irradiating the light emitting section 4 including a phosphor with the laser light that is guided by the optical fiber 12. In the present embodiment, the light emitting device 14A emits illumination light that is obtained by mixing the laser light that is emitted from the semiconductor laser 11 and the florescence that is generated by irradiating the light emitting section 4 with the laser light. The configuration of the light emitting device 14A will be described later.

Light-Transmitting Lens 15

The light-transmitting lens 15 is a light-transmitting member through which the illumination light that is emitted from the light emitting device 14A is transmitted. The light-transmitting lens 15 transmits the illumination light in a desired range of angles by refracting the illumination light that is emitted from the light emitting device 14A.

The light-transmitting lens 15 is formed of, for example, an acrylic resin, polycarbonate, silicone, borosilicate glass, BK7, quartz, or the like.

The light-transmitting lens 15 is fixed in a position that faces the light emitting section 4 of the light emitting device 14A by the light-transmitting lens fixing section 16.

Light-Transmitting Lens Fixing Section 16

The light-transmitting lens fixing section 16 fixes the light emitting device 14A and the light-transmitting lens 15. The light-transmitting lens fixing section 16 is composed of a cylindrical section with light-shielding properties. The light-transmitting lens fixing section 16 fixes the light emitting device 14A and the light-transmitting lens 15 by holding a circumferential surface of the light emitting device 14A and a circumferential surface of the light-transmitting lens 15 inside the light emitting device 14A.

It is preferable that the light-transmitting lens fixing section 16 is formed of a material with high heat dissipation properties, and particularly, it is possible to preferably use an anodized aluminum member.

By using the light-transmitting lens fixing section 16, heat that is generated at the light emitting device 14A can be efficiently dissipated by the light-transmitting lens fixing section 16. In addition, it is possible to transmit illumination light that is emitted from the light emitting device 14A at a desired range of angles by making the light incident on the light-transmitting lens 15 without leakage to the outside.

Configuration of the Light Emitting Device 14A

Figure 2:
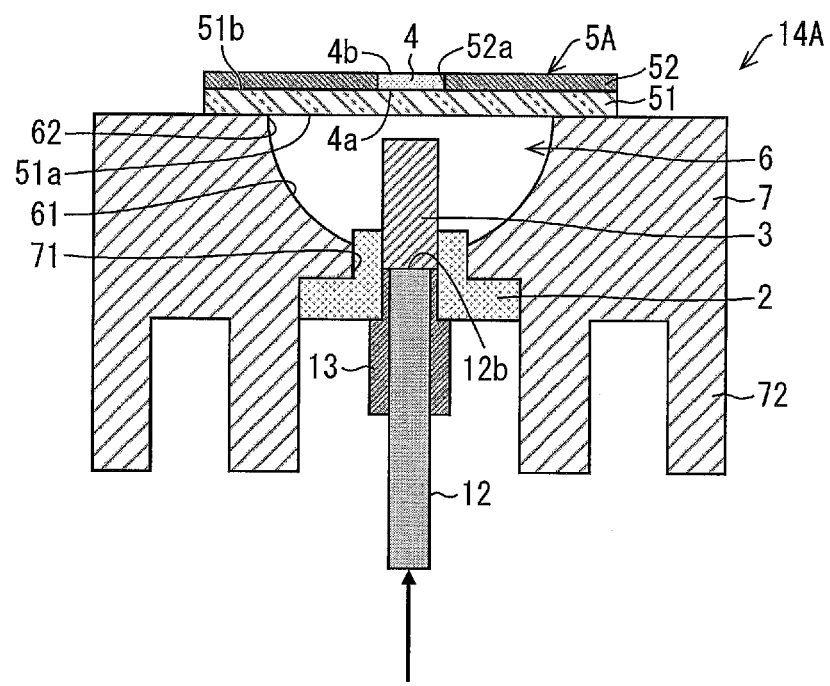
FIG. 2 is a sectional view illustrating a configuration of a light emitting device illustrated in FIG. 1.

FIG. 2 is a sectional view illustrating a configuration of the light emitting device 14A illustrated in FIG. 1. As illustrated in FIG. 2, the light emitting device 14A includes a rod lens fixing section 2, a rod lens 3, the light emitting section 4, a cover section 5A, a reflection mirror 6, and a metal base 7.

Rod Lens Fixing Section 2

The rod lens fixing section 2 fixes the rod lens 3 in the inside of the reflection mirror 6. The rod lens fixing section 2 is a cylindrical member with light-shielding properties and is inserted in a light guiding section insertion hole 71 of the metal base 7 which is formed at the bottom of a curved reflective surface 61 of the reflection mirror 6.

The rod lens fixing section 2 fixes the rod lens 3 and the optical fiber 12 by holding the ferrule 13 that is inserted from one end and the rod lens 3 that is inserted from the other end, in the inside thereof. As a result, the rod lens 3 and the optical fiber 12 are optically coupled to each other in the hole of the rod lens fixing section 2.

It is preferable that the rod lens fixing section 2 is a member that does not absorb light, and is formed of, for example, Al.

Rod Lens 3

The rod lens (excitation light emitting section) 3 is a light guiding member that guides the laser light that is emitted from the emission end portion 12b of the optical fiber 12 to the vicinity of the light emitting section 4. The rod lens 3 receives the laser light that is emitted from the emission end portion 12b of the optical fiber 12 and is incident on one end of the rod lens 3 which faces the emission end portion 12b, guides the laser light, and substantially emits the laser light from the other end of the rod lens 3 that is disposed in the vicinity of the light emitting section 4.

The rod lens 3 is formed of, for example, BK7, quartz glass, an acrylic resin, polycarbonate, or the like.

In the present embodiment, the rod lens 3 uses a rod lens (with a diameter of 1 mm×length of 2 mm, made by Edmund Optics, Inc.) which has a cylindrical shape and is formed of BK7. However, the shape of the rod lens 3 is not limited to a cylindrical shape, and can be appropriately selected. The rod lens 3 may have, for example, a polygonal shape, or may have a shape that is tapered in a direction in which the laser light is guided.

The present embodiment has a configuration in which the laser light that is emitted from the semiconductor laser 11 is radiated to the light emitting section 4 through the optical fiber 12 and the rod lens 3, but the present disclosure is not limited to this configuration. For example, the present disclosure may have a configuration in which the laser light that is emitted from the semiconductor laser 11 is radiated to the light emitting section 4 through the optical fiber 12 alone. In this configuration, the optical fiber 12 functions as the excitation light emitting section of the present disclosure. In addition, the present disclosure may have a configuration in which the laser light that is emitted from the semiconductor laser 11 is collected directly or collected by a light collecting lens, and is radiated to the light emitting section 4. In this configuration, the semiconductor laser 11 functions as the excitation light emitting section of the present disclosure.

Light Emitting Section 4

The light emitting section 4 generates fluorescence based on illumination of the laser light that is emitted from the rod lens 3. The light emitting section 4 includes a phosphor that receives the laser light and generates the fluorescence, the phosphor being dispersed in a sealing material. The light emitting section 4 emits illumination light from a main light emitting surface 4b, the light being obtained by mixing the laser light that is radiated to a laser light irradiation surface 4a that is a lower surface of the light emitting section 4 facing the other end of the rod lens 3 with the fluorescence that is obtained by converting the wavelength of part of the laser light.

The light emitting section 4 may include one type of phosphor or two types or more of phosphors. For example, if the illumination device 1 is used as a headlamp for a vehicle, illumination light is desired to be white with a chromaticity of a certain range. Therefore, in order to have white light for the illumination light of the illumination device 1, a combination of the laser light and the phosphor is appropriately selected.

For example, it is possible to obtain white illumination light by radiating blue laser light to the light emitting section 4 that includes a yellow phosphor (for example, Ce-activated YAG phosphor).

In addition, it is possible to obtain white illumination light by radiating blue laser light to the light emitting section 4 that includes any one of (a) a green phosphor (for example, green Eu-activated β-SiAlON) and an orange phosphor (for example, orange Eu-activated α-SiAlON), (b) a green phosphor (for example, green Eu-activated β-SiAlON) and a red phosphor (for example, red Eu-activated CASN), or (c) a green phosphor (for example, green Eu-activated β-SiAlON), an orange phosphor (for example, orange Eu-activated α-SiAlON), and a red phosphor (for example, red Eu-activated CASN).

The sealing material of the light emitting section 4 can be appropriately selected from a silicone resin, an acrylic resin, glass (organic-inorganic hybrid glass or inorganic glass), or the like.

The light emitting section 4 is located on an optical axis of the laser light that is emitted from the rod lens 3, and is held by the cover section 5A at the spherical center of the reflection mirror 6 or a focal position.

It is preferable that the size of the light emitting section 4 is equal to or larger than a spot diameter of the laser light that is radiated to the laser light irradiation surface 4a. The spot diameter of the laser light can be appropriately modified, but for example, if the spot diameter of the laser light is approximately 1.5 mm, the size of the light emitting section 4 is approximately 1.7 mm.

Cover Section 5A

The cover section 5A is a plate-shaped member that is disposed over an opening 62 of the reflection mirror 6. The cover section 5A holds the light emitting section 4 and suppresses the laser light which is emitted from the rod lens 3, is radiated to the vicinity of the light emitting section 4, and is output to the outside. The cover section 5A includes a light-transmitting plate 51 and a reflection film 52.

Light-Transmitting Plate 51

The light-transmitting plate 51 is a plate-shaped member with light-transmitting properties. The light-transmitting plate 51 holds the light emitting section 4 and the reflection film 52 on a surface (hereinafter, referred to as an upper surface) 51b opposite to another surface (hereinafter, referred to as a lower surface) 51a facing the rod lens 3.

It is preferable that the light-transmitting plate 51 is formed of a material with high light-transmitting properties and high heat dissipation properties, and for example, a sapphire substrate can be appropriately used. By using the light-transmitting plate 51 with high light-transmitting properties, the laser light that is emitted from the rod lens 3 can be efficiently transmitted through the light-transmitting plate 51 and be radiated to the light emitting section 4, and thus it is possible to increase the utilization efficiency of the laser light. In addition, by using the light-transmitting plate 51 with high heat dissipation properties, the heat of the light emitting section 4 that is generated by irradiation of the laser light can be efficiently dissipated by the light-transmitting plate 51, and thus it is possible to reduce the degradation of the light emitting section 4 due to heat.

The thickness of the light-transmitting plate 51 can be appropriately selected according to the material or the like of the light-transmitting plate 51. For example, if a sapphire substrate is used as the light-transmitting plate 51, a thickness thereof is approximately 0.5 mm.

Reflection Film 52

The reflection film (reflection layer, optical member) 52 reflects, among the laser light that is emitted from the rod lens 3, laser light that is radiated to the vicinity of the light emitting section 4 toward the rod lens 3.

The reflection film 52 has a light-transmitting hole 52a corresponding to the size of the light emitting section 4, on an optical axis of the laser light that is emitted from the rod lens 3. The light emitting section 4 is disposed inside the light-transmitting hole 52a so as to close the light-transmitting hole 52a. Accordingly, the reflection film 52 can reflect the laser light (for example, laser light or the like that is leaked from the circumferential surface of the rod lens 3) that is radiated to the vicinity of the light emitting section 4, among the laser light that is emitted from the rod lens 3, toward the rod lens 3.

The reflection film 52 is formed of a material with a high reflectance in the visible light region, such as Al or Ag, and is preferably formed of Al. Since Al is not expensive as compared with Ag, it is possible to reduce manufacturing costs.

In addition, it is preferable that the thickness of the reflection film 52 is smaller than that of the light emitting section 4. If the thickness of the reflection film 52 is greater than that of the light emitting section 4, part of the illumination light including fluorescence that is emitted from a main light emitting surface 4b of the light emitting section 4 hits a side surface of the reflection film 52, and as a result, the utilization efficiency of the illumination light is decreased. For example, if the reflection film 52 is formed of Al (reflectance is approximately 90%), approximately 10% of the illumination light that hits the side surface of the reflection film 52 is absorbed by the side surface, and loss of the illumination light occurs. Thus, by forming the thickness of the reflection film 52 smaller than that of the light emitting section 4, it is possible to reduce the loss of the illumination light.

The reflection film 52 can be formed by depositing a material of the reflection film 52 on the light-transmitting plate 51, in a state in which, for example, a portion where the light-transmitting hole 52a is formed is protected by a mask. Alternatively, the reflection film 52 may be formed by pasting an Al thin film in which the light-transmitting hole 52a is formed, on the light-transmitting plate 51, using a heat-resistance transparent resin. The temperature of the light emitting section 4 at the time of irradiation of the laser light increases up to approximately 200 degrees Celsius. Accordingly, it is preferable to use an acrylic-based transparent resin or the like with excellent heat resistance properties.

Reflection Mirror 6

The reflection mirror 6 collects the laser light that is reflected by the reflection film 52, in the light emitting section 4. In the present embodiment, the reflection mirror 6 has a curved reflective surface 61 of a concave shape. The shape of the reflection mirror 6 can be appropriately selected from a hemisphere, a parabola, and the like. If a hemisphere type is selected, it is preferable that the light emitting section 4 is disposed on the spherical center of a hemisphere mirror. In addition, if a parabola type is selected, it is preferable that the light emitting section 4 is disposed at the focal point of the parabolic mirror. By disposing the light emitting section 4 in those positions, among the fluorescence which is emitted to the outside of the light emitting device 14A from the light emitting section 4, light distribution characteristics of the fluorescence that is generated by irradiation of the laser light which is collected by the reflection mirror 6 and the fluorescence that is generated by the laser light which is directly radiated to the light emitting section 4 from the rod lens 3 substantially coincide with each other, and thus it is possible to reduce color unevenness of the light emitting device 14A.

The reflection mirror 6 has a circular opening 62, and the cover section 5A is disposed so as to close the opening 62. By closing the opening 62 of the reflection mirror 6 using the cover section 5A, the light emitting section 4 is allowed to exist on an optical path of the laser light toward the outside (light-transmitting hole 52a) of the light emitting device 14A, among the laser light that is emitted from the rod lens 3, and thus it is possible to suppress that coherent laser light is output to the outside as it is.

In the embodiment, the reflection mirror 6 is formed in the metal base 7 of, for example, anodized aluminum. Specifically, the reflection mirror 6 is formed by performing mirror-finishing on a concave portion of a hemispherical shape formed in the metal base 7. However, the reflection mirror 6 and the metal base 7 may be separately formed as an independent member.

If light emission distribution of the fluorescence that is generated by the laser light which is directly radiated to the light emitting section 4 from the rod lens 3 is different from light emission distribution of the fluorescence that is generated by the laser light which is collected by the reflection mirror 6, the difference causes color unevenness of the light emitting section 4. Accordingly, for example, it is preferable that the size and position of a spot of the laser light on a laser light irradiation surface 4a, which is directly radiated to the light emitting section 4 from the rod lens 3 coincide with the size and position of a spot on the laser light irradiation surface 4a, which is collected by the reflection mirror 6. As a result, it is possible to reduce color unevenness of the light emitting section 4.

Metal Base 7

The metal base 7 supports each member, and is formed of a metal (for example, Al) or the like. Accordingly, the metal base 7 has high heat conductivity and is able to efficiently conduct and dissipate the heat of each member. For example, the heat that is generated by the light emitting section 4 is transferred to the metal base 7 through the light-transmitting plate 51. According to this, the metal base 7 can efficiently dissipate the heat that is generated by the light emitting section 4, and thus it is possible to reduce degradation of the light emitting section 4 due to the heat.

For the metal base 7, an envelope volume of the metal base 7, and the number, the size, or the like of a heat dissipation fin 72 to be described later are appropriately designed in accordance with a thermal resistance value of each member, specified temperature of the light emitting section 4, or the like. The metal base 7 is, for example, a cylindrical member with an envelope volume of a diameter of about 25 mm and a thickness of about 17 mm.

The metal base 7 includes the heat dissipation fin 72. The heat dissipation fin 72 dissipates the heat of the metal base 7 in the air. The heat dissipation fin 72 is composed of a plurality of heat dissipation plates so as to increase a contact area with the air, thereby increasing heat dissipation efficiency. The heat dissipation fin 72 is formed of a material with high heat conductivity, in the same manner as the metal base 7.

Workings of Light Emitting Device 14A

Figure 3A:
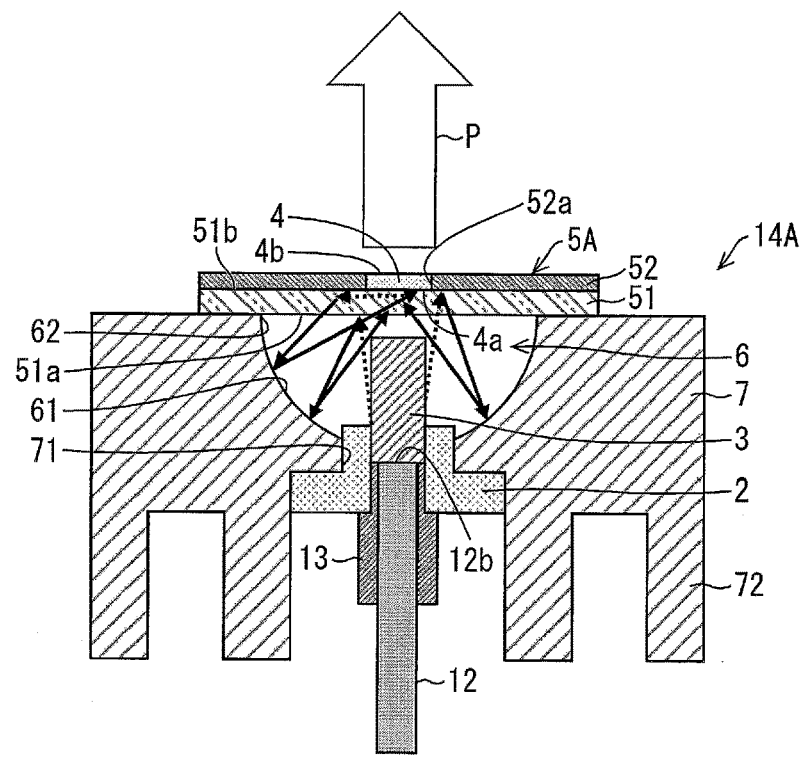
FIGS. 3A and 3B are sectional views illustrating the workings of light emitting devices, where
Figure 3B:
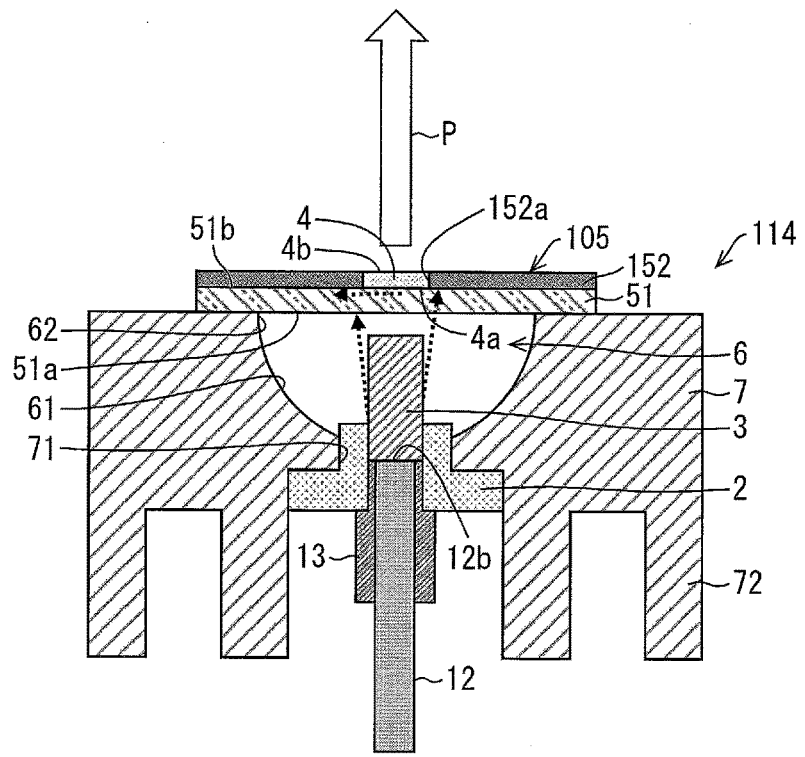

FIGS. 3A and 3B are sectional views illustrating the workings of the light emitting device 14A, where FIG. 3A illustrates the workings of the light emitting device 14A according to the present embodiment, and FIG. 3B illustrates the workings of a light emitting device 114 in which the reflection film 52 is replaced with an absorption film 152, as a comparative example.

The illumination light which is emitted from the light emitting device 14A includes laser light in addition to fluorescence that is denoted by P in FIGS. 3A and 3B, but the laser light is omitted in the figures and only the fluorescence P is illustrated.

As illustrated in FIG. 3B, in the light emitting device 114 that includes a cover section 105 in which the reflection film 52 is replaced with the absorption film 152, the laser light that is not radiated to the light emitting section 4 among the laser light that is emitted from the rod lens 3 is absorbed by the absorption film 152. Thus, in the light emitting device 114, the laser light that is used for excitation of the light emitting section 4 is reduced, and thereby an amount of light of the fluorescence P that is generated by the light emitting section 4 is reduced.

In contrast to this, in the light emitting device 14A according to the present embodiment, the laser light that is not radiated to the light emitting section 4, among the laser light that is emitted from the rod lens 3, is not absorbed and is reflected toward the rod lens 3 by the reflection film 52. Thus, the laser light that is reflected by the reflection film 52 is collected to the light emitting section 4 by the reflection mirror 6.

In this way, the light emitting device 14A collects the laser light that is not radiated to the light emitting section 4 and the laser light that is reflected by a surface of the light emitting section 4, among the laser light that is emitted from the rod lens 3, in the light emitting section 4, and can reuse the laser light for excitation of the light emitting section 4. Thus, according to the light emitting device 14A, more fluorescence P is generated in the light emitting section 4 than in the light emitting device 114, and can be emitted from the main light emitting surface 4b.

In addition, in the light emitting device 14A, the opening 62 of the reflection mirror 6 is closed by the light emitting section 4 and the reflection film 52, and thus the light emitting section 4 is allowed to exist on an optical path of the laser light toward the outside (light-transmitting hole 52a) of the light emitting device 14A, among the laser light that is emitted from the rod lens 3. Accordingly, even if coherent laser light is used, the laser light is absorbed in the light emitting section 4 and color thereof is converted into the fluorescence P when being transmitted through the light emitting section 4. Alternatively, the laser light that is not converted into the fluorescence P is diffused, thereby becoming incoherent light, and then is emitted from the main light emitting surface 4b of the light emitting section 4.

Thus, according to the light emitting device 14A, an output of the coherent laser light as it is to the outside is suppressed, and thus it is possible to enhance safety.

Effects of Illumination Device 1

As described above, the illumination device 1 according to the present embodiment includes the light emitting device 14A that emits the illumination light including the fluorescence P, using the laser light that is emitted from the semiconductor laser 11. The light emitting device 14A includes the rod lens 3 that emits the laser light, the light emitting section 4 that generates the fluorescence P based on the irradiation of laser light that is emitted from the rod lens 3, the reflection film 52 that reflects the laser light which is not radiated to the light emitting section 4, such as the laser light that is leaked from a circumferential surface of the rod lens 3, toward the rod lens 3 (or toward the reflection mirror 6), and the reflection mirror 6 that collects the laser light which is reflected by the reflection film 52, in the light emitting section 4.

In the light emitting device 14A, the laser light that is radiated to the vicinity of the light emitting section 4 among the laser light which is emitted from the rod lens 3, that is, the laser light that is not radiated to the light emitting section 4 and is not used for generating the fluorescence P is reflected toward the rod lens 3 by the reflection film 52. The laser light that is reflected by the reflection film 52 is collected in the light emitting section 4 by the reflection mirror 6.

Accordingly, in the light emitting device 14A, the laser light that is not radiated to the light emitting section 4 and is not used for generating the fluorescence P, among the laser light that is emitted from the rod lens 3, is not removed (absorbed), is collected in the light emitting section 4, and can be reused for excitation of the light emitting section 4.

Thus, according to the present embodiment, it is possible to reduce excitation light that is not radiated to the light emitting section 4 and is not used for generating the fluorescence P, and to realize the illumination device 1 with excellent utilization efficiency of the laser light.

Second Embodiment

Another embodiment according to the present disclosure will be described with reference to FIG. 4 and FIG. 5 as follows. For the sake of convenience of description, the same symbols or reference numerals will be given to the members having the same functions as the members described in the above embodiment, and description thereof will be omitted.

Configuration of Light Emitting Device 14B

Figure 4:
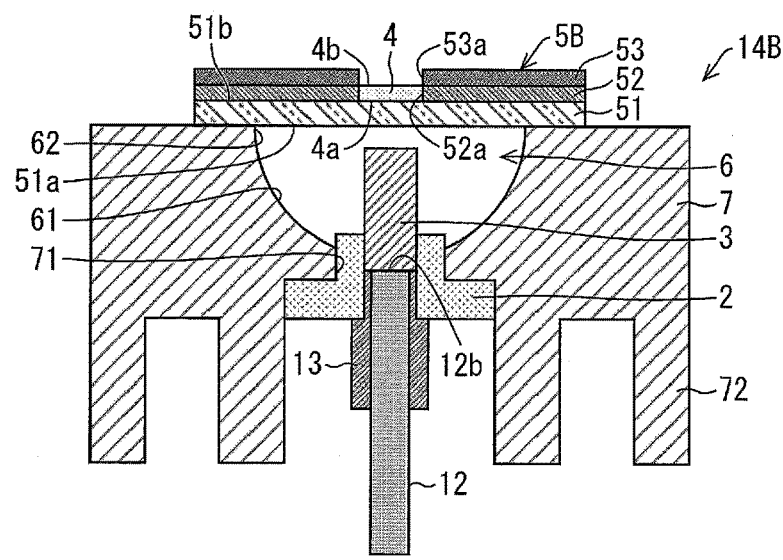
FIG. 4 is a sectional view illustrating a configuration of a light emitting device according to a second embodiment.

FIG. 4 is a sectional view illustrating a configuration of a light emitting device 14B according to the present embodiment. The light emitting device 14B is mainly different from the light emitting device 14A described above in a point that the light emitting device 14B further includes a light absorbing film 53 that absorbs light.

As illustrated in FIG. 4, the light emitting device 14B includes the rod lens fixing section 2, the rod lens 3, the light emitting section 4, a cover section 5B, the reflection mirror 6, and the metal base 7.

Cover Section 5B

The cover section 5B according to the present embodiment includes the light-transmitting plate 51, the reflection film 52, and the light absorbing film 53. Specifically, the cover section 5B includes the reflection film 52 and the light absorbing film 53 that are stacked on an upper surface 51b of the light-transmitting plate 51.

Light Absorbing Film 53

The light absorbing film (excitation light absorbing layer, fluorescence absorbing layer, optical member) 53 absorbs the laser light and/or the fluorescence P. That is, the light absorbing film 53 absorbs the laser light (excitation light) and/or the fluorescence P with a wavelength longer than the laser light that are included in the illumination light. The light absorbing film 53 is provided on a surface of the reflection film 52, which is on a side opposite to another surface facing the rod lens 3.

In the same manner as the reflection film 52, the light absorbing film 53 has a light-transmitting hole 53a corresponding to the size of the light emitting section 4 on an optical axis of the laser light that is emitted from the rod lens 3. The light-transmitting hole 53a of the light absorbing film 53 has the same size as the light-transmitting hole 52a of the reflection film 52, and a center thereof coincides with the center of the light-transmitting hole 52a. Accordingly, the fluorescence P that is emitted from the main light emitting surface 4b of the light emitting section 4 is transmitted through the light-transmitting hole 53a of the light absorbing film 53, is output to the outside of the light emitting device 14B, and is transmitted through the light-transmitting lens 15.

The light absorbing film 53 is not particularly limited, if the material thereof can absorb the laser light and/or the fluorescence P included in the illumination light. However, it is preferable that the light absorbing film 53 is black. When the laser light is radiated, the temperature of the light emitting section 4 increases up to approximately 200° C. Thus, it is preferable that the light absorbing film 53 is formed of a material with high heat-resistance properties, and the light absorbing film 53 is preferably formed of, for example, carbon or the like. The light absorbing film 53 is attached to the reflection film 52 by an acrylic-based heat-resistance transparent resin or the like.

Workings of Light Emitting Device 14B

Figure 5:
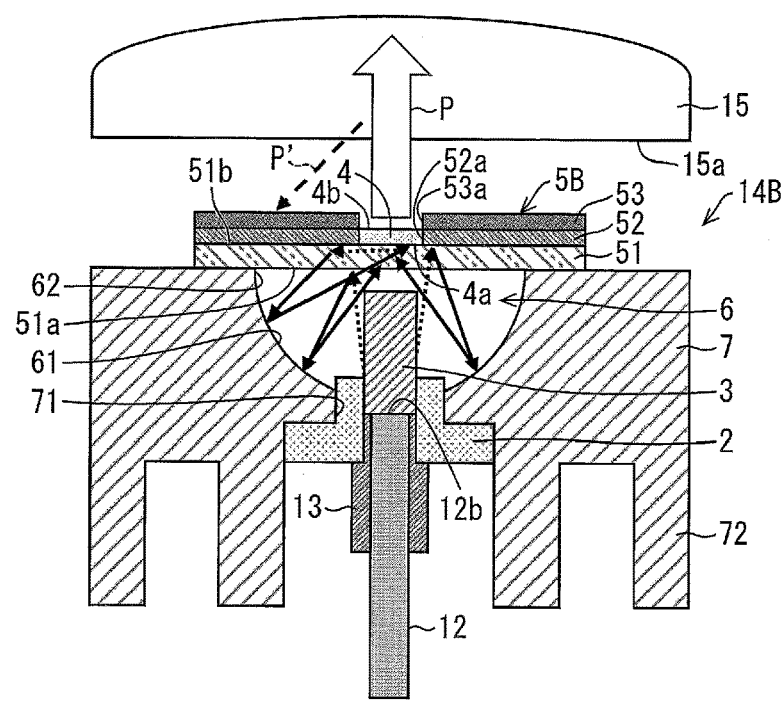
FIG. 5 is a sectional view illustrating the workings of the light emitting device according to the second embodiment.

FIG. 5 is a sectional view illustrating the workings of the light emitting device 14B. As illustrated in FIG. 5, if a light-transmitting member such as the light-transmitting lens 15 is installed in the immediate vicinity of the light emitting section 4, reflection components P' can be generated from the fluorescence P or the like that is reflected to the reflection film 52 by a light incident surface 15a of the light-transmitting lens 15.

The light emitting device 14B can suppress the reflection components P' being reflected by the reflection film 52 again and incident on the light-transmitting lens 15, and thus it is possible to increase uniformity of the illuminance of illumination light.

That is, in the light emitting device 14B according to the present embodiment, the reflection components P' can be absorbed by the light absorbing film 53. Accordingly, in the light emitting device 14B, an amount of light of the reflection components P' that are incident on the light-transmitting lens 15 is greatly reduced, and thus it is possible to improve non-uniformity of the illuminance of the illumination light caused by the reflection components P' that are incident on the light-transmitting lens 15.

Effects of Light Emitting Device 14B

As described above, the light emitting device 14B according to the present embodiment further includes the light absorbing film 53 that absorbs the laser light and/or the fluorescence P generated by the light emitting section 4, on a surface of the reflection film 52, which is on a side opposite to another surface facing the rod lens 3.

In the light emitting device 14B, the reflection components P' from a light-transmitting member such as the light-transmitting lens 15 are absorbed by the light absorbing film 53, and thus it is possible to suppress the reflection components P' being incident on the light-transmitting lens 15.

Thus, according to the present embodiment, it is possible to realize the light emitting device 14B in which influence of the reflection components P' from the light-transmitting lens 15 are suppressed, and uniformity of the illuminance of the illumination light is increased.

Third Embodiment

Still another embodiment according to the present disclosure will be described with reference to FIG. 6 and FIG. 7 as follows. For the sake of convenience of description, the same symbols or reference numerals will be given to the members having the same functions as the members described in the above embodiments, and description thereof will be omitted.

Configuration of Light Emitting Device 14C

Figure 6:
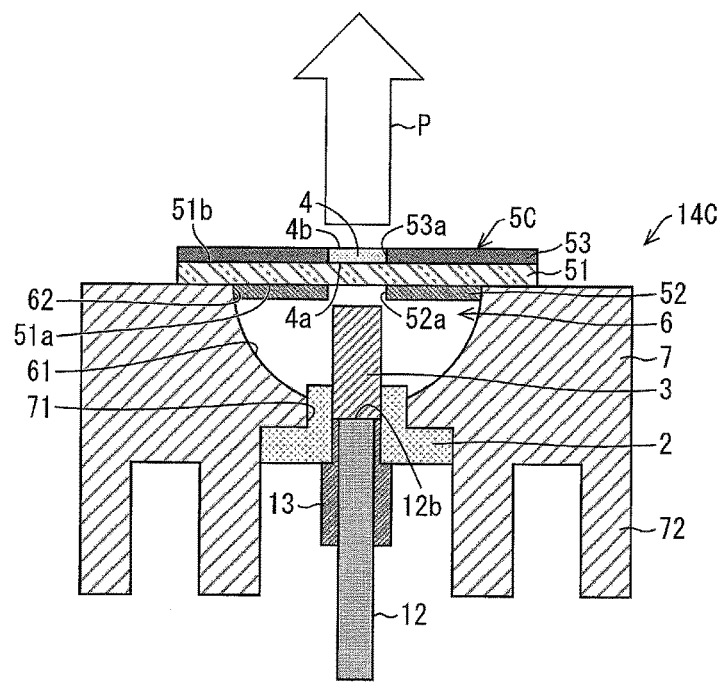
FIG. 6 is a sectional view illustrating a configuration of a light emitting device according to a third embodiment.

FIG. 6 is a sectional view illustrating a configuration of a light emitting device 14C according to the present embodiment. The light emitting device 14C is mainly different from the light emitting device 14B described above in a point that the reflection film 52 is disposed on a lower surface 51a of the light-transmitting plate 51, and the light emitting section 4 is disposed inside the light-transmitting hole 53a of the light absorbing film 53.

As described in FIG. 6, the light emitting device 14C includes the rod lens fixing section 2, the rod lens 3, the light emitting section 4, a cover section 5C, the reflection mirror 6, and the metal base 7.

Cover Section 5C

The cover section 5C according to the present embodiment includes the light-transmitting plate 51, the reflection film 52, and the light absorbing film 53. Specifically, in the cover section 5C, the reflection film 52 is disposed on a lower surface 51a of the light-transmitting plate 51, and the light absorbing film 53 is disposed on an upper surface 51b of the light-transmitting plate 51.

Reflection Film 52

In the present embodiment, the reflection film 52 is disposed on the lower surface 51a of the light-transmitting plate 51, and the reflection film 52 has the light-transmitting hole 52a on an optical axis of the laser light that is emitted from the rod lens 3.

Accordingly, the reflection film 52 reflects the laser light that is not incident on the light-transmitting hole 52a among the laser light that is emitted from the rod lens 3, that is, the laser light that is not radiated to the light emitting section 4, toward the rod lens 3. Thus, the laser light that is reflected by the reflection film 52 is collected in the light emitting section 4 by the reflection mirror 6.

Thus, it is possible to reuse the laser light that is not radiated to the light emitting section 4 and the laser light that is reflected by a surface of the light emitting section 4, among the laser light that is emitted from the rod lens 3, for the excitation of the light emitting section 4.

The light-transmitting hole 52a that is formed in the reflection film 52 according to the present embodiment may have the same size as that of the light emitting section 4, may have the same size as a spot diameter of the laser light that is radiated to the laser light irradiation surface 4a of the light emitting section 4, or may have a size larger than the spot diameter.

Light Absorbing Film 53

In the present embodiment, the light absorbing film 53 is disposed on the upper surface 51b of the light-transmitting plate 51. In addition, the light absorbing film 53 has the light-transmitting hole 53a corresponding to the size of the light emitting section 4 on an optical axis of the laser light that is emitted from the rod lens 3, and the light emitting section 4 is disposed inside the light-transmitting hole 53a so as to close the light-transmitting hole 53a.

Workings of Light Emitting Device 14C

Figure 7:
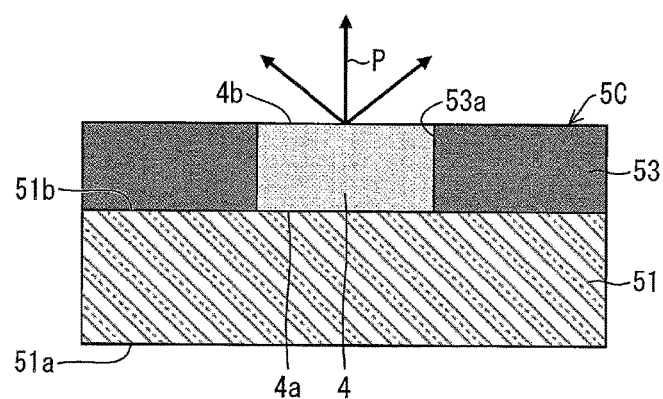
FIG. 7 is an enlarged view illustrating a cover section illustrated in FIG. 6.

FIG. 7 is an enlarged view illustrating the cover section 5C illustrated in FIG. 6. As illustrated in FIG. 7, the fluorescence P that is emitted from the main light emitting surface 4b of the light emitting section 4 has a certain angle of emission. Accordingly, if the height of the main light emitting surface 4b of the light emitting section 4 is lower than an upper surface of the light absorbing film 53, when the fluorescence P that is emitted from the main light emitting surface 4b of the light emitting section 4 is transmitted though the light-transmitting hole 53a of the light absorbing film 53, the fluorescence P hits the inner surface of the light-transmitting hole 53a and thereby is absorbed.

Therefore, in the light emitting device 14C according to the present embodiment, since the reflection film 52 is disposed on the lower surface 51a of the light-transmitting plate 51, only the light absorbing film 53 is disposed as an optical member on the upper surface 51b of the light-transmitting plate 51. According to this, it is possible to reduce the thickness of the optical member on the upper surface 51b of the light-transmitting plate 51. Hence, it is easy to make the thickness of the light absorbing film 53 equal to the thickness of the light emitting section 4, or to make the thickness of the light absorbing film 53 smaller than the thickness of the light emitting section 4. Thus, it is possible to control absorption of the fluorescence P which is emitted from the main light emitting surface 4b of the light emitting section 4 into the light absorbing film 53. Accordingly, it is possible to increase extraction efficiency of the illumination light in the light emitting device 14C.

A reflection member may be inserted between a side surface of the light emitting section 4 and the light absorbing film 53. By inserting the reflection member, it is possible to prevent the light that is emitted from the side surface of the light emitting section 4 from being absorbed by the light absorbing film 53, and thus it is possible to increase an amount of light that is emitted from the light emitting section 4.

Effects of Light Emitting Device 14C

As described above, in the light emitting device 14C according to the present embodiment, the reflection film 52 is disposed on the lower surface 51a of the light-transmitting plate 51, the light emitting section 4 and the light absorbing film 53 are disposed on the upper surface 51b of the light-transmitting plate 51, and the thickness of the light absorbing film 53 is equal to that of the light emitting section 4 or is smaller than that of the light emitting section 4.

In the light emitting device 14C, the thickness of the light absorbing film 53 is equal to or smaller than that of the light emitting section 4, and thus it is possible to control absorption of the laser light and the fluorescence P by the light absorbing film 53.

Thus, according to the present embodiment, it is possible to realize the light emitting device 14C in which extraction efficiency is increased.

Fourth Embodiment

Still another embodiment according to the present disclosure will be described with reference to FIG. 8 as follows. For the sake of convenience of description, the same symbols or reference numerals will be given to the members having the same functions as the members described in the above embodiments, and description thereof will be omitted.

Configuration of Light Emitting Device 14D

Figure 8:
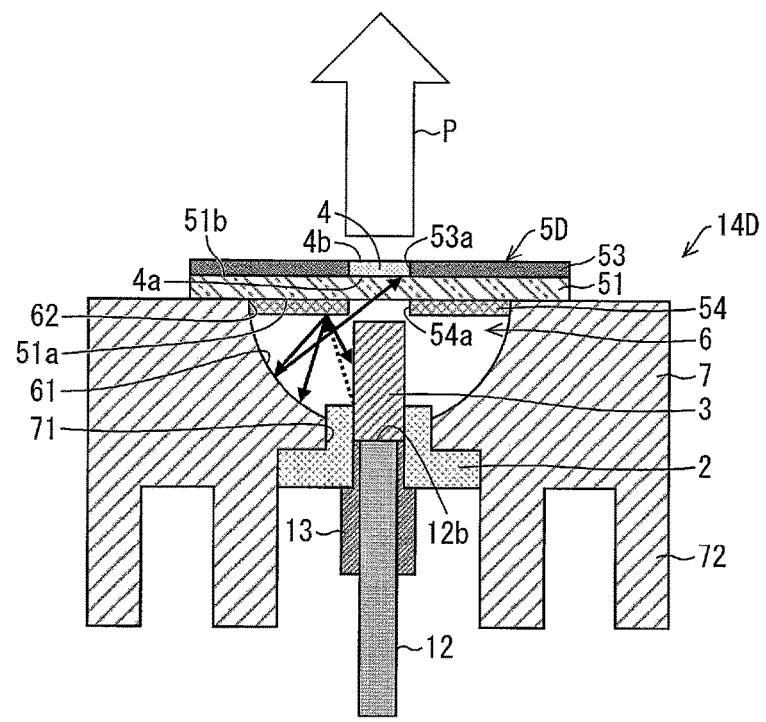
FIG. 8 is a sectional view illustrating a configuration of a light emitting device according to a fourth embodiment.

FIG. 8 is a sectional view illustrating a configuration of a light emitting device 14D according to the present embodiment. The light emitting device 14D is mainly different from the light emitting device 14C described above in a point that, instead of the reflection film 52, a diffusion reflection film 54 is disposed on a lower surface 51a of the light-transmitting plate 51.

As described in FIG. 8, the light emitting device 14D includes the rod lens fixing section 2, the rod lens 3, the light emitting section 4, a cover section 5D, the reflection mirror 6, and the metal base 7.

Cover Section 5D

The cover section 5D according to the present embodiment includes the light-transmitting plate 51, the diffusion reflection film 54, and the light absorbing film 53. Specifically, in the cover section 5D, the diffusion reflection film 54 is disposed on a lower surface 51a of the light-transmitting plate 51, and the light absorbing film 53 is disposed on an upper surface 51b of the light-transmitting plate 51.

Diffusion Reflection Film 54

The diffusion reflection film (reflection layer, optical member) 54 diffuses and reflects the laser light that is not radiated to the light emitting section 4 among the laser light that is emitted from the rod lens 3, toward the rod lens 3. The diffusion reflection film 54 is disposed on the lower surface 51a of the light-transmitting plate 51, and the diffusion reflection film 54 has the light-transmitting hole 54a on an optical axis of the laser light that is emitted from the rod lens 3.

Accordingly, the diffusion reflection film 54 diffuses and reflects the laser light that is not incident on the light-transmitting hole 54a among the laser light that is emitted from the rod lens 3, that is, the laser light that is not radiated to the light emitting section 4, toward the rod lens 3. Thus, the laser light that is diffused and reflected by the diffusion reflection film 54 is collected in the light emitting section 4 by the reflection mirror 6.

Thus, it is possible to reuse the laser light that is not radiated to the light emitting section 4 and the laser light that is reflected by a surface of the light emitting section 4, among the laser light that is emitted from the rod lens 3, for the excitation of the light emitting section 4.

For example, the diffusion reflection film 54 may be formed by forming slight roughness on a reflection surface of the diffusion reflection film 54, or by depositing Al or the like on the lower surface 51a of the light-transmitting plate 51 on which a structure of slight roughness is formed.

Alternatively, the diffusion reflection film 54 may be a diffusion resin layer that is formed by dispersing scattered particles (filler) on a reflection surface of the reflection film 52 described above. When being transmitted through the diffusion resin layer, the coherent laser light that is emitted from the rod lens 3 is converted into incoherent diffusion light and is reflected by the reflection film 52.

Alternatively, the diffusion reflection film 54 may be a diffusion resin layer that is directly formed on the lower surface 51a of the light-transmitting plate 51. In this case, the diffusion resin layer uses a member that is filled with filler at a density through which laser light is not substantially transmitted, or a member having a thickness through which the laser light is not transmitted. Even if part of the laser light is transmitted through the diffusion resin layer, the laser light can be absorbed by the light absorbing film 53, and thus it is possible to prevent the laser light from being output to the outside of the light emitting device 14D. However, in order to increase utilization efficiency of the laser light of the light emitting device 14D, it is preferable that the diffusion resin layer is configured so that as much as laser light is not transmitted.

Workings of Light Emitting Device 14D

If the laser light in a state of not being diffused is collected in the light emitting section 4 by the reflection mirror 6, the laser light is not uniformly radiated to the laser light irradiation surface 4a of the light emitting section 4. If the fluorescence P that is generated by such light emitting section 4 is transmitted through the light-transmitting lens 15, intensity of illuminance light that is transmitted through the light-transmitting lens 15 may increase in the vicinity of the center of illuminance distribution.

Accordingly, as illustrated in FIG. 8, the laser light that is reflected by the diffusion reflection film 54 is diffused and reflected in the light emitting device 14D. If the laser light in a state of being diffused is collected in the light emitting section 4 by the reflection mirror 6, the laser light is radiated more uniformly to the laser light irradiation surface 4a of the light emitting section 4. As a result, uniformity of the light emitted from the main light emitting surface 4b of the light emitting section 4 increases.

Thus, it is possible to improve uniformity of the illuminance distribution of the illumination light, when the illumination light that is emitted from the light emitting device 14D is transmitted through the light-transmitting lens 15.

Effects of Light Emitting Device 14D

As described above, the light emitting device 14D includes the diffusion reflection film 54 that diffuses and reflects the laser light which is not radiated to the light emitting section 4, among the laser light that is emitted from the rod lens 3, toward the rod lens 3.

In the light emitting device 14D, the laser light which is not radiated to the light emitting section 4, among the laser light that is emitted from the rod lens 3, is diffused and reflected by the diffusion reflection film 54. Accordingly, by collecting the laser light in a state of being diffused, in the light emitting section 4 using the reflection mirror 6, it is possible to uniformly radiate the laser light to the light emitting section 4.

Thus, according to the present embodiment, it is possible to realize the light emitting device 14D in which light emission unevenness of the light emitting section 4 is decreased.

Fifth Embodiment

Still another embodiment according to the present disclosure will be described with reference to FIG. 9 as follows. For the sake of convenience of description, the same symbols or reference numerals will be given to the members having the same functions as the members described in the above embodiments, and description thereof will be omitted.

Configuration of Light Emitting Device 14E

Figure 9:
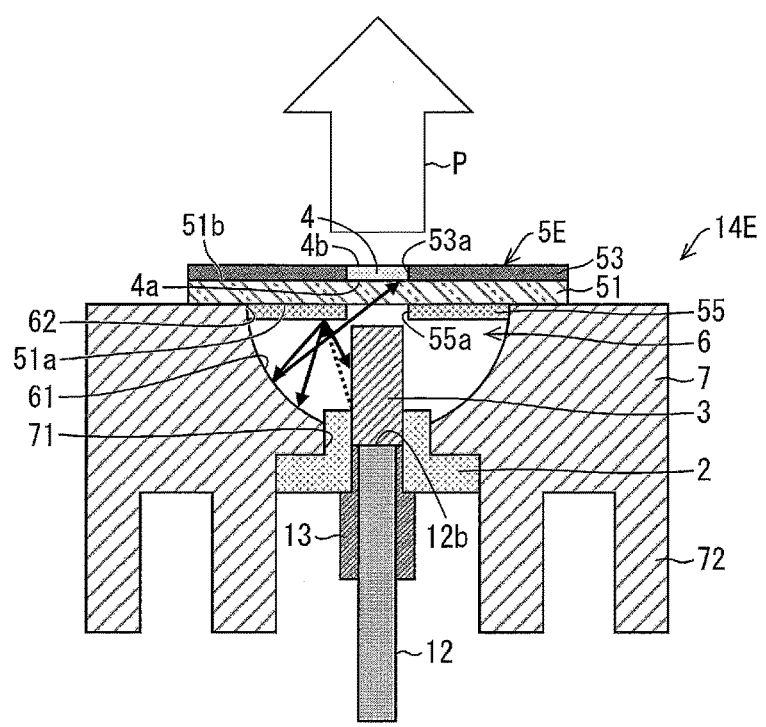
FIG. 9 is a sectional view illustrating a configuration of a light emitting device according to a fifth embodiment.
Figure 10:
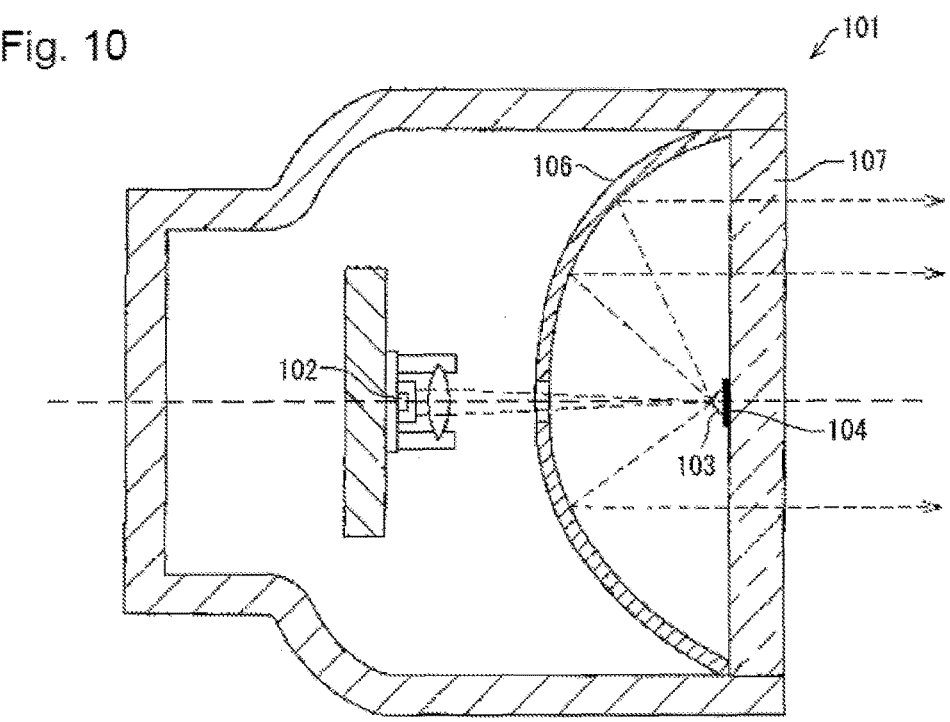
FIG. 10 is a sectional view illustrating a configuration of a light emitting device of the related art.
Figure 11:
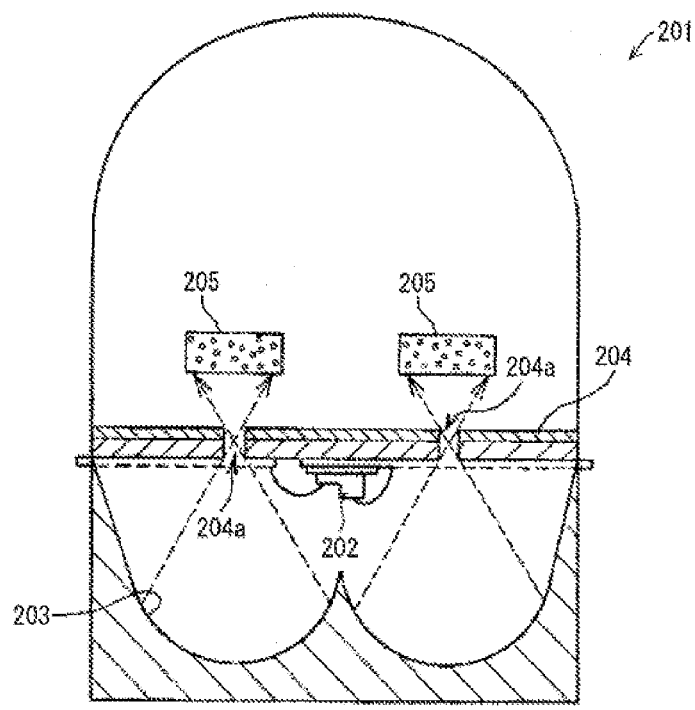
FIG. 11 is another sectional view illustrating a configuration of a light emitting device of the related art.
Figure 12:
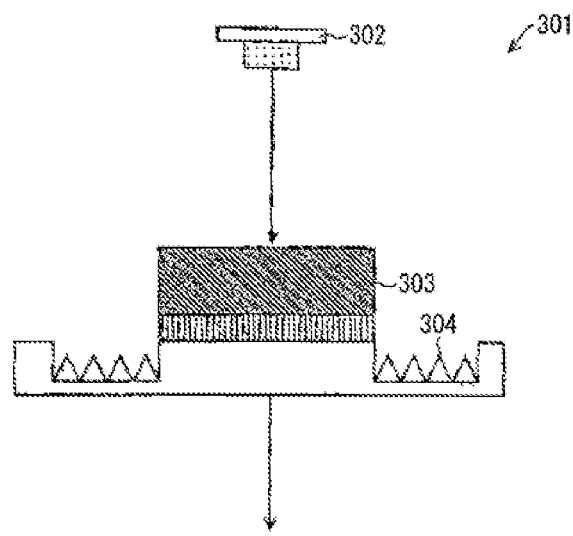
FIG. 12 is still another sectional view illustrating a configuration of a light emitting device of the related art.
Figure 13:
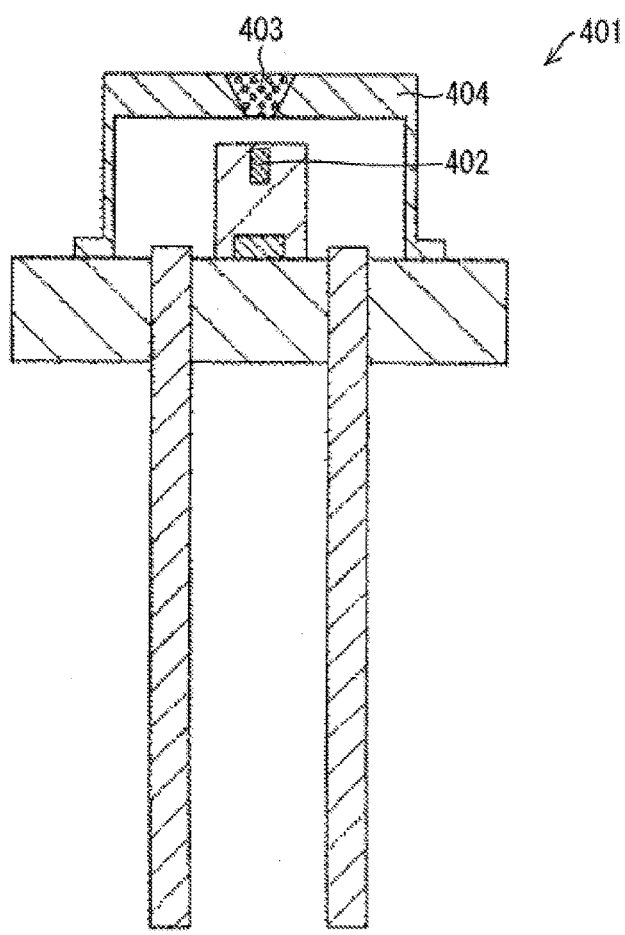
FIG. 13 is still another sectional view illustrating a configuration of a light emitting device of the related art.

FIG. 9 is a sectional view illustrating a configuration of a light emitting device 14E according to the present embodiment. The light emitting device 14E is mainly different from the light emitting device 14D described above in a point that, instead of the diffusion reflection film 54, a phosphor film 55 is disposed on a lower surface 51a of the light-transmitting plate 51.

As described in FIG. 9, the light emitting device 14E includes the rod lens fixing section 2, the rod lens 3, the light emitting section 4, a cover section 5E, the reflection mirror 6, and the metal base 7.

Cover Section 5E

The cover section 5E according to the present embodiment includes the light-transmitting plate 51, the phosphor film 55, and the light absorbing film 53. Specifically, in the cover section 5E, the phosphor film 55 is disposed on a lower surface 51a of the light-transmitting plate 51, and the light absorbing film 53 is disposed on an upper surface 51b of the light-transmitting plate 51.

Phosphor Film 55

The phosphor film (phosphor layer, optical member) 55 receives the laser light that is not radiated to the light emitting section 4 among the laser light that is emitted from the rod lens 3, and emits fluorescence (wavelength-converted light) that is obtained by converting the wavelength of the laser light, toward the rod lens 3.

The phosphor film 55 is disposed on the lower surface 51a of the light-transmitting plate 51, and the phosphor film 55 has a light-transmitting hole 55a on an optical axis of the laser light that is emitted from the rod lens 3.

The phosphor film 55 uses a film in which a phosphor is dispersed at a density through which laser light is not substantially transmitted, or a film having a thickness through which the laser light is not substantially transmitted. Accordingly, the phosphor film 55 receives the laser light that is not incident on the light-transmitting hole 55a, among the laser light that is emitted from the rod lens 3, that is, the laser light that is not radiated to the light emitting section 4, converts the received laser light into fluorescence, and emits the fluorescence toward the rod lens 3. Thus, the fluorescence that is emitted by the phosphor film 55 is collected in the light emitting section 4 by the reflection mirror 6. The fluorescence that is collected in the light emitting section 4 may be emitted from the main light emitting surface 4b as it is as part of illumination light, or part thereof may be absorbed into a phosphor included in the light emitting section 4 and may be converted into another fluorescence.

Even if part of the laser light is transmitted through the phosphor film 55, the laser light can be absorbed by the light absorbing film 53. Accordingly, it is possible to prevent the laser light from being output to the outside of the light emitting device 14E. However, in order to increase utilization efficiency of the laser light of the light emitting device 14E, it is preferable that the phosphor film 55 is configured so that as much as laser light is not transmitted.

In addition, the reflection film 52 described above may be disposed between the phosphor film 55 and the light-transmitting plate 51. According to this, components heading for the light-transmitting plate 51, among the laser light that is transmitted through the phosphor film 55 and the fluorescence that is generated by the phosphor film 55, can be reflected by the reflection film 52, and thus it is possible to increase utilization efficiency of the laser light of the light emitting device 14E.

The light that is reflected by the reflection film 52 is the laser light that is transmitted through the phosphor film 55, the fluorescence that is emitted from the phosphor film 55, and diffused light. Thus, even if the light is reflected by the reflection film 52 that regularly reflects the light, safety is ensured because the light is diffused in advance.

Workings of Light Emitting Device 14E

As illustrated in FIG. 9, in the light emitting device 14E, the phosphor film 55 receives the laser light that is not incident on the light-transmitting hole 55a, among the laser light that is emitted from the rod lens 3, converts the received laser light into fluorescence, and emits the resultant light toward the rod lens 3. The fluorescence that is emitted by the phosphor film 55 is collected in the light emitting section 4 by the reflection mirror 6.

Thus, it is possible to convert the laser light that is not radiated to the light emitting section 4 among the laser light that is emitted from the rod lens 3, into the fluorescence and to reuse the fluorescence for part of illumination light.

In addition, in the light emitting device 14E, the laser light is converted into the fluorescence by both of the phosphor film 55 and the light emitting section 4. Thus, it is possible to increase conversion efficiency from the laser light into the fluorescence.

Effects of Light Emitting Device 14E

As described above, the light emitting device 14E includes the phosphor film 55 that includes a phosphor, and a light absorbing layer that absorbs the laser light which is transmitted through the phosphor film 55.

In the light emitting device 14E, the excitation light that is not radiated to the light emitting section 4 among the laser light that is emitted from the rod lens 3 is received by the phosphor film 55, becomes the fluorescence whose wavelength is converted, and is emitted toward the rod lens 3 from the phosphor film 55. The fluorescence that is emitted by the phosphor film 55 is collected by the reflection mirror 6, and radiated to the light emitting section 4. Meanwhile, the laser light that is transmitted through the phosphor film 55 is absorbed by the light absorbing film 53.

Thus, according to the present embodiment, it is possible to realize the light emitting device 14E which can convert the laser light that is not used for generating the fluorescence P among the laser light which is emitted from the rod lens 3 into fluorescence, and can reuse the fluorescence as part of the illumination light.

Overview

A light emitting device according to a first aspect of the present disclosure includes: an excitation light emitting section that emits excitation light (laser light); a light emitting section that receives the excitation light which is emitted from the excitation light emitting section and generates fluorescence; an optical member that reflects excitation light which is radiated to the vicinity of the light emitting section, among excitation light that is emitted from the excitation light emitting section, toward the excitation light emitting section, or emits wavelength-converted light in which a wavelength of the excitation light is converted, toward the excitation light emitting section; and a reflection mirror that collects the excitation light which is reflected by the optical member or the wavelength-converted light which is emitted from the optical member, in the light emitting section.

In the above configuration, excitation light that is radiated to the vicinity of a light emitting section among the excitation light which is emitted from an excitation light emitting section, that is, excitation light that is not radiated to the light emitting section and is not used for generating fluorescence is (1) reflected toward the excitation light emitting section by an optical member, or (2) emitted toward the excitation light emitting section as wavelength-converted light in which a wavelength is converted by the optical member. Thus, the excitation light or the wavelength-converted light that is emitted by the optical member is collected in the light emitting section by a reflection mirror.

Thus, by collecting the excitation light that is reflected by the optical member in the light emitting section by using the reflection mirror, it is possible to reuse the excitation light that is not radiated to the light emitting section among the excitation light which is emitted from the excitation light emitting section, for excitation of the light emitting section.

In addition, by collecting the wavelength-converted light that is emitted from the optical member in the light emitting section by using the reflection mirror, it is possible to convert the excitation light that is not radiated to the light emitting section among the excitation light which is emitted from the excitation light emitting section into the wavelength-converted light, and to reuse the wavelength-converted light as part of illumination light.

In this way, in the configuration described above, the excitation light that is not radiated to the light emitting section among the excitation light which is emitted from the excitation light emitting section is not removed (absorbed), and can be reused as excitation light or the wavelength-converted light from the light emitting section for part of the illumination light.

Thus, according to the configuration described above, it is possible to realize a light emitting device that reduces the excitation light which is not radiated to the light emitting section and is not used for generation of the fluorescence, and that has excellent utilization efficiency of the excitation light.

A light emitting device of a second aspect of the present disclosure, in the first aspect, may have a configuration in which the optical member includes a reflection layer (reflection film 52) that reflects the light toward the excitation light emitting section.

In the configuration described above, the excitation light that is not radiated to the light emitting section among the excitation light which is emitted from the excitation light emitting section is reflected toward the excitation light emitting section by the reflection layer. Thus, the excitation light that is reflected by the reflection layer is collected in the light emitting section by the reflection mirror.

Thus, by collecting the excitation light that is not radiated to the light emitting section among the excitation light which is emitted from the excitation light emitting section, in the light emitting section, it is possible to reuse the excitation light for excitation of the light emitting section.

The light emitting device of a third aspect of the present disclosure, in the second aspect, may have a configuration in which the reflection layer (diffusion reflection film 54) diffuses and reflects light.

In the configuration described above, the excitation light that is not radiated to the light emitting section among the excitation light which is emitted from the excitation light emitting section is diffused and reflected by the reflection layer. Accordingly, by collecting the diffused excitation light in the light emitting section by using the reflection mirror, it is possible to uniformly radiate the excitation light to the light emitting section.

Thus, according to the configuration described above, it is possible to control light emitting unevenness of the light emitting section.

A light emitting device of a fourth aspect of the present disclosure, in any one of the first to third aspects, may have a configuration in which the optical member further includes a fluorescence absorbing layer (light absorbing film 53) that absorbs fluorescence which is generated by the light emitting section, on a surface on a side opposite to a side facing the excitation light emitting section.

In the configuration described above, if fluorescence that is generated by a light emitting section is transmitted through a light-transmitting member such as a light-transmitting lens, components that are reflected by a surface of the light-transmitting member among the fluorescence which is generated by the light emitting section can be absorbed by a fluorescence absorbing layer. Accordingly, it is possible to suppress the components reflected by the surface of the light-transmitting member being reflected again by the light emitting device and being incident on the light-transmitting member.

Thus, according to the configuration described above, it is possible to reduce influence of reflection components from the light-transmitting member, and to increase uniformity of the illuminance of the illumination light.

A light emitting device of a fifth aspect of the present disclosure, in the first aspect, may have a configuration in which the optical member includes a phosphor layer (phosphor film 55) including a phosphor, and a excitation light absorbing layer (light absorbing film 53) that absorbs the excitation light which is transmitted through the phosphor layer and is emitted from the excitation light emitting section.

In the configuration described above, the excitation light that is not radiated to the light emitting section among the excitation light which is emitted from the excitation light emitting section is emitted toward the excitation light emitting section as wavelength-converted light in which wavelength is converted by the phosphor film. Then, the wavelength-converted light that is emitted from the phosphor layer is collected in the light emitting section by the reflection mirror.

Thus, according to the configuration described above, it is possible to convert the excitation light that is not radiated to the light emitting section among the excitation light which is emitted from the excitation light emitting section, into wavelength-converted light, and to reuse the wavelength-converted light as part of the illumination light.

In addition, according to the configuration described above, even if part of the excitation light is transmitted though the phosphor layer, the excitation light can be absorbed by an absorbing layer. Thus, it is possible to suppress an output of the excitation light that is transmitted through the phosphor layer, to the outside of the light emitting device.

A light emitting device of a sixth aspect of the present disclosure, in any one of the first to fifth aspects, may have a configuration in which the optical member has a light-transmitting hole on an optical axis of excitation light that is emitted from the excitation light emitting section, and the light emitting section is disposed so as to close the light-transmitting hole.

According to the configuration described above, the excitation light that is not incident on the light-transmitting hole among the excitation light which is emitted from the excitation light emitting section, can be reflected toward the excitation light emitting section by the optical member, or can be emitted toward the excitation light emitting section by the optical member as wavelength-converted light in which a wavelength is converted.

A light emitting device of a seventh aspect of the present disclosure, in the sixth aspect, may have a configuration in which a light-transmitting plate with light-transmittance is further included, and the light emitting section and the optical member are disposed on the light-transmitting plate.

In the configuration described above, the light emitting section and the optical member are disposed on a surface of the light-transmitting plate, and thereby the light emitting section and the optical member can be held by the light-transmitting plate.

Thus, According to the configuration described above, the light emitting section and the optical member can be thinned. In addition, if the optical member is composed of a plurality of layers, the layers can be disposed on the upper surface or a lower surface of the light-transmitting plate so as to be separated from each other, and the degree of freedom of disposition of the optical member can be increased.

A light emitting device of an eighth aspect of the present disclosure, in the seventh aspect, may have a configuration in which the light emitting section and the optical member are disposed on a surface on a side opposite to another surface facing the excitation light emitting section, of the light-transmitting plate, and the thickness of the optical member is smaller than that of the light emitting section.

In the configuration described above, the thickness of the optical member is smaller than that of the light emitting section, and thus it is possible to suppress the fluorescence which is emitted from an end surface of the light emitting section being reflected or absorbed by the optical member.

Thus, according to the configuration described above, it is possible to increase light distribution characteristics of the light emitting device or light extraction efficiency of the fluorescence.

A light emitting device of a ninth aspect of the present disclosure, in any one of the first to eighth aspects, may have a configuration in which the reflection mirror has a concave reflection surface, and an opening of the reflection mirror is closed by the light emitting section and the optical member.

In the configuration described above, the excitation light is allowed to be transmitted through the light emitting section and be output to the outside of the reflection mirror. Accordingly, even if coherent excitation light is used, the coherent excitation light is diffused when being transmitted through the light emitting section, thereby becoming incoherent excitation light and being output from the light emitting section.

Thus, according to the configuration described above, an output of the coherent excitation light to the outside of the light emitting device is suppressed, and thus it is possible to enhance safety of the light emitting device.

An illumination device according to a tenth aspect of the present disclosure includes the light emitting device according to any one of the first to ninth aspects.

Thus, according to the configuration described above, it is possible to realize an illumination device that reduces the excitation light which is not radiated to the light emitting section and is not used for generation of the fluorescence, and that has excellent utilization efficiency of the excitation light.

The present disclosure is not limited to the respective embodiments described above, various modifications can be made within the scope described in the claims, and embodiments that are obtained by appropriately combining the technical means which are respectively disclosed in the different embodiments are also included in the technical scope of the present disclosure. Furthermore, by combining the technical means that are respectively disclosed in the respective embodiments, noble technical characteristics can be formed.

The present disclosure can be appropriately used for a light emitting device that uses laser light, and particularly, can be suitably used for a headlamp for a vehicle, a spotlight, a projector, or the like.

The present disclosure contains subject matter related to that disclosed in Japanese Priority Patent Application JP 2014-194272 filed in the Japan Patent Office on Sep. 24, 2014, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A light emitting device comprising:
   an excitation light emitting section that emits excitation light;
   a light emitting section that receives the excitation light emitted from the excitation light emitting section and generates fluorescence;
   an optical member that reflects excitation light which is radiated to a vicinity of the light emitting section, among excitation light emitted from the excitation light emitting section, toward the excitation light emitting section; and
   a reflection mirror that collects the excitation light reflected by the optical member in the light emitting section, wherein
   the optical member has a light-transmitting hole on an optical axis of excitation light emitted from the excitation light emitting section, and
   the light emitting section is disposed so as to close the light-transmitting hole.

2. The light emitting device according to claim 1, wherein the optical member includes a reflection layer that reflects light toward the excitation light emitting section and the reflection layer diffuses and reflects light.

3. The light emitting device according to claim 1, wherein the optical member further includes a fluorescence absorbing layer that absorbs fluorescence generated by the light emitting section, on a second surface opposite a first surface facing the excitation light emitting section.

4. The light emitting device according to claim 1, wherein the optical member includes a phosphor layer that includes a phosphor and an excitation light absorbing layer that absorbs excitation light emitted from the excitation light emitting section and transmitted through the phosphor layer.

* * * * *